United States Patent
Moelkner et al.

(10) Patent No.: US 7,159,448 B2
(45) Date of Patent: Jan. 9, 2007

(54) COMBUSTION-CHAMBER PRESSURE SENSOR HAVING A METALLIC DIAPHRAGM CONTAINING A PIEZORESISTIVE, THIN METALLIC LAYER

(75) Inventors: Thomas Moelkner, Stuttgart (DE); Holger Scholzen, Stuttgart (DE); Joerg Gebers, Hemmingen (DE); Ralf Kaiser, Unterbruenden (DE); Carsten Kaschube, Nuertingen (DE); Christian Roesser, Grossbottwar-Winzerhausen (DE); Lothar Baumann, Wernau (DE); Hans-Peter Didra, Kusterdingen-Jettenburg (DE); Roger Frehoff, Gerlingen (DE); Markus Fissler, Tamm (DE); Markus Ledermann, Asperg (DE); Benjamin Thiel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/897,848

(22) Filed: Jul. 22, 2004

(65) Prior Publication Data

US 2005/0034525 A1 Feb. 17, 2005

(30) Foreign Application Priority Data

Jul. 23, 2003 (DE) .................. 103 33 438

(51) Int. Cl.
*G01M 15/00* (2006.01)
(52) U.S. Cl. .................. 73/35.12; 73/115; 73/116; 73/117.3; 73/118.1
(58) Field of Classification Search ........... 73/35.12, 73/35.13, 115, 715, 721; 310/338
See application file for complete search history.

(56) References Cited

U.S. PATENT DOCUMENTS

| | | | | |
|---|---|---|---|---|
| 2,068,744 A | * | 1/1937 | Gutzke | ................ 73/714 |
| 4,382,377 A | * | 5/1983 | Kleinschmidt et al. | .... 73/35.13 |
| 4,590,400 A | * | 5/1986 | Shukla et al. | ................ 310/338 |
| 4,920,805 A | * | 5/1990 | Yajima et al. | ................ 73/706 |
| 4,939,497 A | * | 7/1990 | Nishida et al. | ................ 338/4 |
| 5,606,117 A | * | 2/1997 | Vogel et al. | .................. 73/115 |
| 5,753,798 A | * | 5/1998 | Engeler et al. | ............ 73/35.13 |
| 6,138,654 A | * | 10/2000 | Pretorius et al. | ............ 123/642 |
| 6,487,898 B1 | * | 12/2002 | Haefner et al. | ................ 73/115 |
| 6,575,039 B1 | * | 6/2003 | Murai et al. | .................. 73/756 |
| 2004/0261502 A1 | * | 12/2004 | Watarai et al. | ............. 73/35.13 |
| 2005/0126297 A1 | * | 6/2005 | Moelkner et al. | ............. 73/715 |

FOREIGN PATENT DOCUMENTS

WO    WO 97/31251    8/1997

OTHER PUBLICATIONS

Kraftfahrttechnischen Taschenbuch Automotive Engineering Paperback Book, 23rd Edition, Braunschweig; Wiesbaden, Viehweg 1999, pp. 110-112, ISBN 3-528-03876-4.

* cited by examiner

*Primary Examiner*—Edward Lefkowitz
*Assistant Examiner*—Freddie Kirkland, III
(74) *Attorney, Agent, or Firm*—Kenyon & Kenyon LLP

(57) ABSTRACT

A pressure sensor for measuring the pressure in a space acted upon by high pressure. The signals detected by the pressure sensor are supplied to evaluation electronics. A sensor diaphragm is accommodated on the end of the pressure sensor pointing towards the space acted upon by high pressure. The sensor diaphragm takes the form of a steel diaphragm, to whose back side a thin, metallic layer accommodating piezoresistive measuring elements is applied. The thin, metallic layer is contacted by transmission elements and connected to the evaluation electronics.

11 Claims, 3 Drawing Sheets

COMBUSTION-CHAMBER PRESSURE SENSOR HAVING A METALLIC DIAPHRAGM CONTAINING A PIEZORESISTIVE, THIN METALLIC LAYER

BACKGROUND INFORMATION

In internal combustion engines of motor vehicles, a pressure measurement for ascertaining the combustion-chamber pressure is necessary, in order to obtain, in each instance, information regarding the pressures prevailing in the combustion chamber of the combustion engine. Information regarding the pressures prevailing in the combustion chambers in each instance may be used for determining the actual engine torque and monitoring the combustion (e.g. misfiring, knock) at in modern engine management systems.

An integrated silicon combustion-chamber pressure sensor is described on page 111 of the kraftfahrttechnischen Taschenbuch Automotive Engineering Paperback Book, 23rd edition, Braunschweig; Wiesbaden, Viehweg 1999, ISBN 3-528-03876-4. The silicon combustion-chamber pressure sensor includes a transmission impacting rod, a silicon platform that is used for applying force, as well as an integrated silicon pressure sensor. Situated on one side of the steel mounting plate is one or more connector pins, from which a connecting line runs to the integrated silicon pressure sensor. In this set-up, the silicon chip is not directly exposed to the high temperatures in a combustion chamber of an internal combustion engine. This is achieved, using a metallic separating diaphragm, as well as a sufficiently long impacting ride for force transmission. The silicon chip becomes a force sensor by micromechanically applying a platform in the center of the diaphragm. The compressive forces absorbed by the front diaphragm are introduced by the impacting rod with only a small amount of additional misrepresentation, via the platform, into the silicon sensor chip. This sensor chip is in a retracted (recessed) mounting position and is therefore only subjected to operating temperatures less than 150° C.

International Application No. WO 97/31251 A describes a combustion-chamber pressure sensor for ascertaining signs of knocking and misfiring. A fiber-optic combustion-chamber pressure sensor is integrated into a spark plug. The former is configured such that a conductor passes through the spark-plug body. A key-shaped (push-button-shaped) diaphragm having a non-uniform thickness reduces the mechanical load acting on the diaphragm and increases the reliability of the sensor. Excessive pressure acting on the combustion-chamber pressure sensor is reduced by forming angled sections on the diaphragm.

Micromechanical combustion-chamber pressure sensors have been shown in practice to be completely capable of being mass-produced, but they have considerable disadvantages. The micromechanical combustion-chamber pressure sensors have only a limited thermal resistance. However, since the micromechanical combustion-chamber pressure sensors must be installed as close to the combustion chamber as possible, they are subjected to higher temperatures, which places corresponding demands regarding the thermal resistance of such combustion-chamber pressure sensors. In addition, the conventional micromechanical combustion-chamber pressure sensors have the disadvantage, that their capability of being miniaturized is limited. Therefore, the micromechanical combustion-chamber pressure sensors used at present require larger mounting surfaces in the region of a cylinder head of a combustion engine. However, the cylinder head of a combustion engine represents a region of the combustion engine, at which the space is already limited due to the multitude of inserted or directly attached components.

Pressure sensors, which function according to the piezoelectric principle and require very expensive evaluation electronics, are also used to precisely determine inner cylinder pressures or combustion-chamber pressures of combustion engines. On the one hand, these pressure sensors are very precise, but, on the other hand, they are very expensive, and because of the voluminous evaluation electronics, they are only suitable for use on test stands and, in the best case, in experimental vehicles. In addition to this application, efforts are also underway to use the measurement of combustion chamber pressure in production engines, in order to achieve engine control based on combustion chamber pressure. However, combustion-chamber pressure sensors, which satisfy the high requirements for a production solution regarding price, handling, and service life while simultaneously satisfying the requirements for the accuracy of the combustion-chamber pressure measurement, are not obtainable on the market.

SUMMARY

A pressure sensor according to an example embodiment of the present invention includes a steel diaphragm, which is situated near the combustion chamber and is provided with a metallic, thin-film piezoresistive measuring bridge on its back side. Because of the small amount of installation space in the cylinder head, the design of the combustion-chamber pressure sensor is very narrow, which is achieved in that the thin metallic layer is compressively contacted by spring elements. The pressure signal is transmitted via electrically conductive insertion parts inserted in a nonconductive base element, through a narrow sensor neck, to the evaluation circuit. The evaluation circuit itself may be advantageously accommodated in a pressure-sensor region whose diameter is widened, and thus, e.g., in a hollow space in the upper region of the pressure sensor.

The steel diaphragm of the refinement of the combustion-chamber pressure sensor according to the present invention allows the hot and aggressive atmosphere, which prevails, for example, inside a combustion chamber of a combustion engine, to be cost-effectively and reliably kept away from the sensor interior. This has a particularly favorable effect on the service life of the combustion-chamber pressure sensor proposed by the present invention. In addition, the utilized piezoresistive, thin metallic layer of the combustion-chamber pressure sensor proposed by the present invention provides a very high accuracy potential, which may be achieved by a very low temperature coefficient with regard to offset, i.e., sensor drift, as well as sensitivity and electrical resistance. Furthermore, the utilized piezoresistive, thin metallic layer has the advantage, that it may permanently withstand temperatures that prevail in the combustion chamber and act on the thin-walled steel diaphragm, in particular on the back side of the steel diaphragm near the combustion chamber. The example design of a pressure sensor according to the present invention for use in combustion chambers of combustion engines is very narrow, above all, in the region near the combustion chamber, i.e., in the cylinder-head region, and therefore requires little space and is resistant, i.e., reliable in the case of temperatures occurring at the cylinder head of a combustion engine.

A variant of a pressure sensor according to the present invention allows the pressure, which prevails in the interior of a cylinder of a combustion engine and is highly dynamic, to be measured with high accuracy. Regarding a production application for combustion engines, the sensor provided by the present invention is very inexpensive, easy to use, and due to, above all, its very narrow design, it is particularly suitable for the installation situation in the cylinder-head region on a combustion engine.

BRIEF DESCRIPTION OF THE DRAWINGS

The pressure sensor of the present invention, which may be used, for example, to monitor pressure in combustion chambers of combustion engines, is described in more detail below.

DETAILED DESCRIPTION OF EXAMPLE EMBODIMENTS

Figure 1:
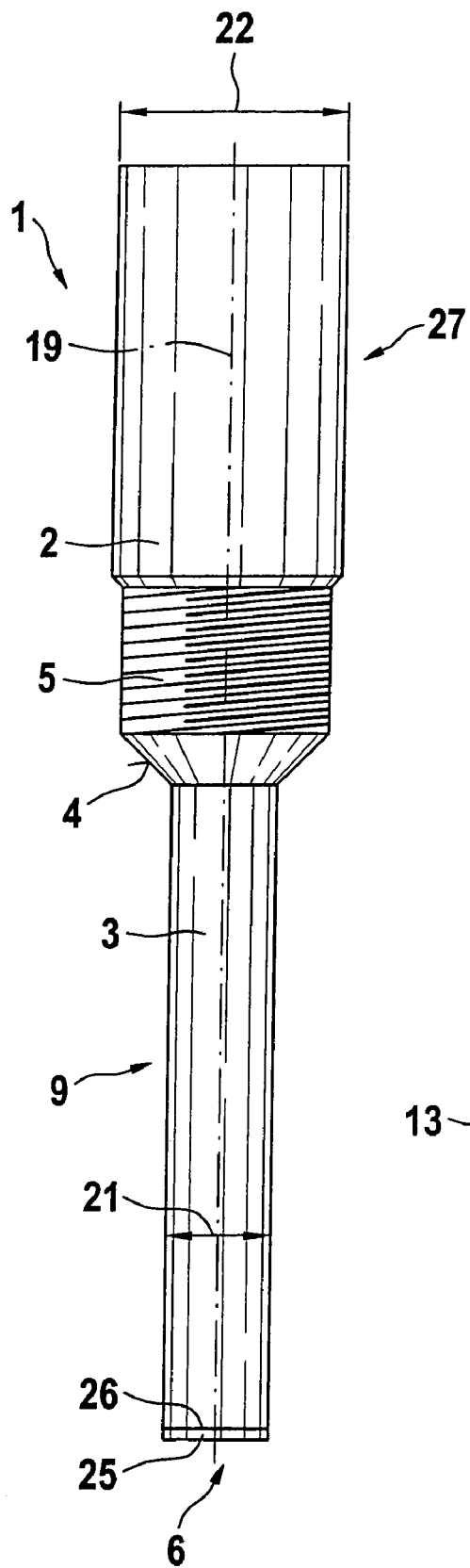
FIG. 1 shows a top view of an axially symmetric pressure sensor for combustion chambers according to an example embodiment of the present invention.

FIG. 1 shows the plan view of a pressure sensor according to the present invention for spaces acted upon by high pressures.

The pressure sensor shown in FIG. 1 is axially symmetric and includes a sensor neck 3 and a sensor head 27. Evaluation electronics not shown in FIG. 1 are integrated into a sensor body 2 of sensor head 27. A threaded section 5, which ends at a conical sealing seat 4, is provided below sensor body 2 of sensor head 27 of pressure sensor 1. Pressure sensor 1 has a cover tube 9 directly contiguous to conical sealing seat 4, the cover tube forming sensor neck 3. Diameter 21 of sensor neck 3 of pressure sensor 1 according to the representation in FIG. 1 is less than diameter 22 of sensor head 27. An insert 25 is inserted into the end of sensor neck 3 pointing towards the space acted upon by pressure, the insert being able to be welded to the cover tube forming sensor neck 3 or connected to it in a different manner.

An example narrow design of sensor 1, according to an example embodiment of the present invention, shown in FIG. 1 allows the pressure sensor to be accommodated under restricted installation-space conditions, as is the case, for example, in the cylinder-head region of a combustion engine. Since the evaluation electronics not shown in FIG. 1 are integrated into a hollow space formed in sensor body 2, the back side of the pressure sensor proposed by the present invention may be directly connected to the engine control unit of a combustion engine, using a cable-harness plug.

Conical sealing seat 4, which is shown in FIG. 1 and formed below threaded section 5, is used for sealing pressure sensor 1 with respect to the cylinder head. The sealing surface taking the form of conical sealing seat 4 may also be shifted from the transition between sensor neck 3, further in the direction of insertion piece 25 having sensor diaphragm 7. In addition, threaded section 5 shown in the view of pressure sensor 1 of the present invention according to FIG. 1 may also be positioned on cover tube 9 forming sensor neck 3 of sensor 1, instead of on sensor body 2. The sensor diaphragm is formed on insert 25 and is not shown in the view according to FIG. 1. The joint designated by reference numeral 26 denotes a welded connection between insert 25 and cover tube 9.

Figure 2:
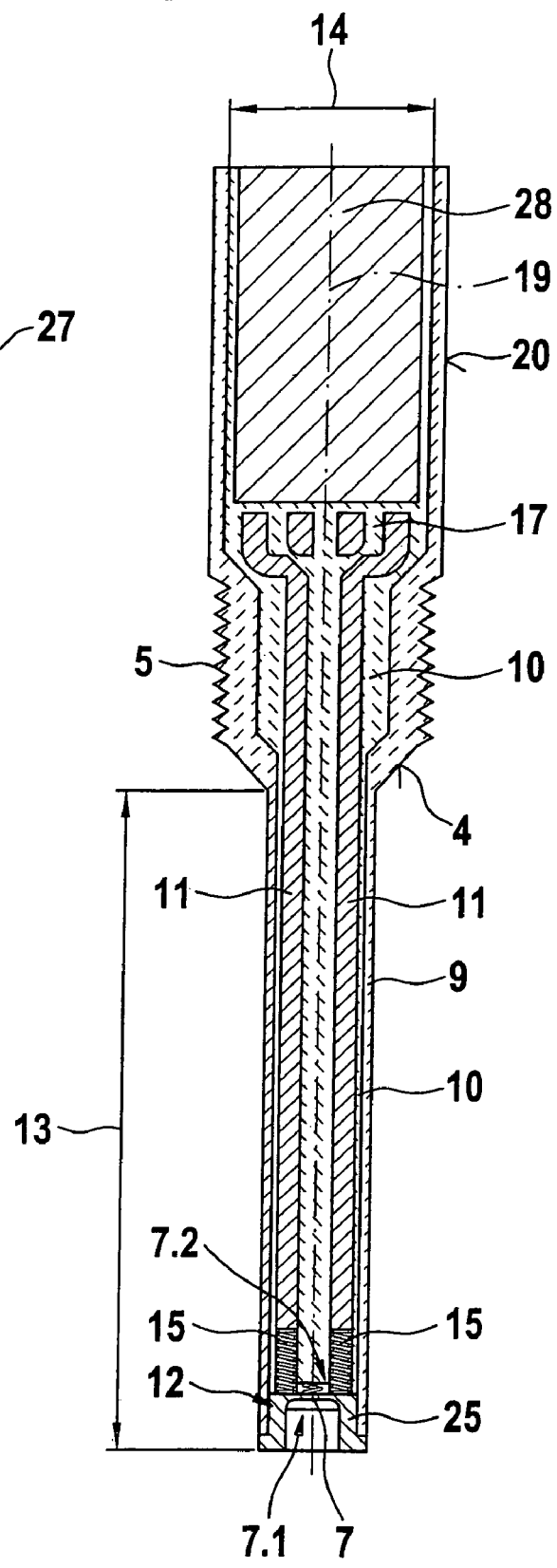
FIG. 2 shows a longitudinal cross-section of the pressure sensor according to the representation in FIG. 1.

The representation shown in FIG. 2 is a longitudinal cross-section of the pressure sensor shown in FIG. 1.

On sensor head 27, pressure sensor 1 according to the representation in FIG. 2 has threaded section 5 already shown in FIG. 1. Threaded section 5 of sensor head 27 gradually changes into a frustoconical sealing surface 4, to which cover tube 9 forming sensor neck 3 is contiguous. Insert 25 is accommodated at end 6 of cover tube 9 on the side of the combustion chamber, the insert having a cup-shaped depression 24, whose boundary surface is formed by a sensor diaphragm 7. Sensor diaphragm 7 preferably takes the form of a steel diaphragm, whose back side 7.2 is provided with a piezoresistive measuring bridge made of a thin, metallic layer 8.

While the side of the sensor diaphragm pointing towards the combustion chamber is denoted by reference numeral 7.1, the side pointing towards sensor neck 3, i.e., the side of sensor diaphragm 7 facing away from the combustion chamber, is identified by reference numeral 7.2. A piezoresistive, thin metallic layer 8, which is contacted by spring elements 15 in the view according to FIG. 2, is applied to side 7.2 of sensor diaphragm 7 facing away from the combustion chamber.

A base element 10 made of a nonconductive material is inserted into cover tube 9 forming sensor neck 3. Insertion parts 11 made of an electrically conductive material are inserted, in turn, into base element 10 inserted into cover tube 9 of sensor neck 3. The oblong, space-saving configuration of insertion parts 11 made of electrically conductive material allows piezoresistive metallic layer 8 applied to side 7.2 of sensor diaphragm 7 facing away from the combustion chamber to be compressively contacted by evaluation electronics 16 accommodated in sensor head 27. Evaluation electronics 16 is indicated by a circuit substrate 28 shown in FIG. 2. Circuit substrate 28 may be, for example, a printed circuit board or a hybrid. The insertion parts, which are made of an electrically conductive material and are formed in base element 10 made of a nonconductive material, are electrically connected to circuit substrate 28, using either compressive contacting or bonded contacting or thermal compression-welded wires. In the view according to FIG. 2, the lower ends of rod-shaped insertion parts 11 made of an electrically conductive material are connected to back side 7.2 of sensor diaphragm 7 via spring elements 15. The compressive contacting, which is achieved via spring elements 15 according to the embodiment variant of pressure sensor 1 shown in FIG. 2, may instead be carried out via S-springs, pressure pins, or Cinch contacts. In the case of Cinch contacts, wires such as gold wires in the shape of a ball are used, whose ball structure allows them to be somewhat elastic and compensate for changes in length. In addition, a bond or a thermal compression weld is possible. After the electrical connection is implemented, both the electrically conductive bond and the thermal compression weld may be swung up 900 with respect to the longitudinal sensor direction, if this is necessary for reasons of space.

Insertion parts 11 made of an electrically conductive material may advantageously be inserted into base element 10 prior to the assembly of base element 10 made out of a nonconductive material. A base element 10 preassembled in such a manner may be inserted, in turn, into cover tube 9, which forms sensor neck 3 of pressure sensor 1 according the present invention. Therefore, the sensor is easily assembled. The length of cover tube 9 denoted by reference numeral 13 may be varied and adapted to match the length ratios of insertion elements 11 made of electrically conductive material to the specific installation situation in the cylinder-head region of a combustion engine.

Contacting 12 between insertion parts 11 made of an electrically conductive material 11 and the piezoresistive components on side 7.2 of sensor diaphragm 7 facing way from the combustion chamber even allows a reliable signal transmission in the case of higher temperatures, as can occur in regions of combustion engines near the combustion chamber. In the representation according to FIG. 2, insert 25 having sensor diaphragm 7 is integrally connected along a joint 26 to the end of cover tube 9 of pressure sensor 1 pointing towards the combustion chamber.

Reference numeral 14 denotes an widened diameter region in sensor head 27 of pressure sensor 1, in which circuit substrate 28 of evaluation electronics 16 may be accommodated. The outer circumferential surface of sensor head 27 of pressure sensor 1, denoted by reference numeral 20, may advantageously be used to allow additional support of pressure sensor 1 in the rear region of pressure sensor 1, in order to reduce the vibrational loads to which pressure sensor 1 of the present invention is subjected.

Figure 3:
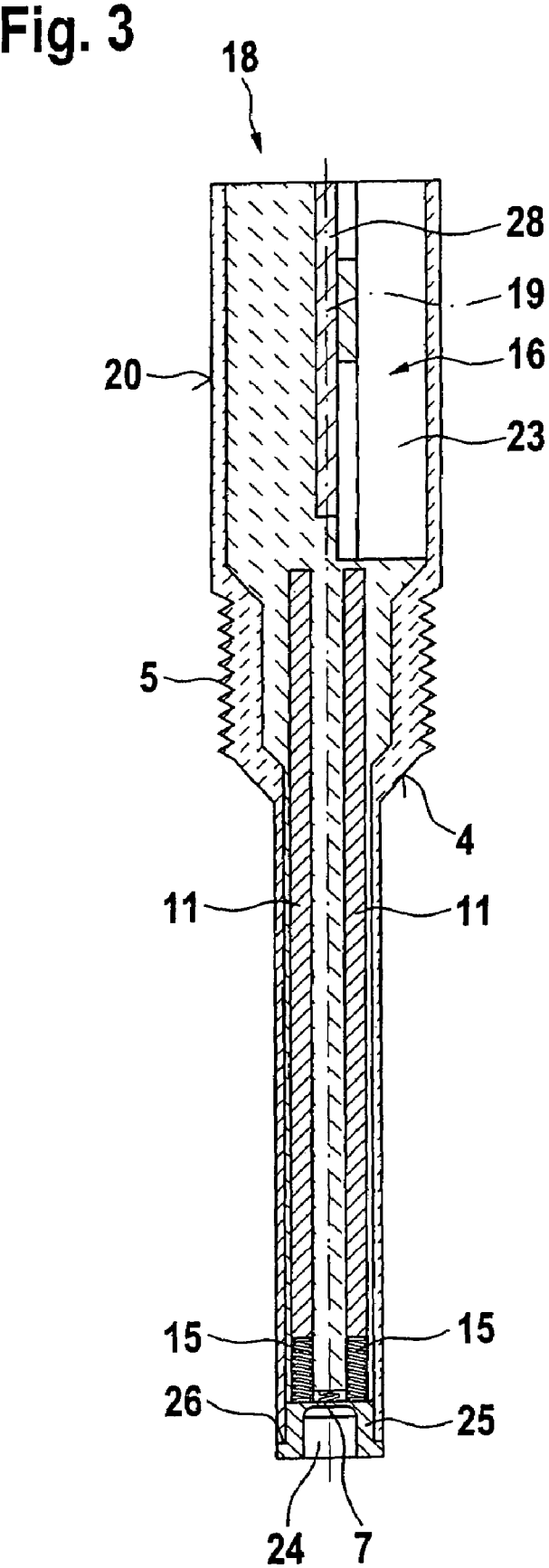
FIG. 3 shows a longitudinal cross-section of the pressure sensor according to the representation in FIG. 1, on a different sectional plane.

A longitudinal cross-section of the pressure sensor of FIG. 1 rotated by 90 degrees with respect to FIG. 2 is shown in the view according to FIG. 3.

From the representation according to FIG. 3, it follows that circuit substrate 28 accommodating evaluation electronics 16 is accommodated in a hollow space 23 in sensor head 27 in a direction parallel to axis of symmetry 19 of pressure sensor 1. In hollow space 23 of sensor head 27 designated by reference numeral 23, both a circuit substrate 28 fitted with components on one side, as shown in FIG. 3, and a circuit substrate 28 fitted with components on both sides may be accommodated. In addition to the configuration variant shown in FIG. 3, circuit substrate 28 may also be accommodated laterally in hollow space 23 inside sensor head 27 of pressure sensor 1. Situated in the upper region of pressure sensor 1 is a terminal region 18, by which the rear region, i.e. sensor head 27 of the pressure sensor proposed by the present invention, may be connected to a cable harness of an engine control unit for a combustion engine, not shown in FIG. 3. From the representation according to FIG. 3, it follows that insert 25 has a depression 24, whose boundary edge forms sensor diaphragm 7, which takes the form of a steel diaphragm. The back side of sensor diaphragm 7 is compressively contacted by spring elements 15, which are, for their part, in contact again with rod-shaped insertion parts 11 in neck region 3 of pressure sensor 1, the rod-shaped insertion parts being made of an electrically conductive material. For their part, the insertion parts, which are configured in the shape of a rod and made of an electrically conductive material, may be electroconductively connected to circuit substrate 28 of evaluation electronics 16, using either compressive contacting as well, or bond contacting. Due to the widening 14 of the diameter in sensor head 27 of pressure sensor 1, circuit substrate 28 of evaluation electronics 16 may easily be accommodated in hollow space 23, so that the sensor signals transmitted through rod-shaped insertion parts 11 made of an electrically conductive material may be supplied to evaluation electronics 16 via a short transmission route.

The narrow design of pressure sensor 1 in accordance with the present invention allows pressure sensor 1 to be installed in restricted installation spaces in the cylinder-head region of a combustion engine. The compressive contacting of piezoresistive, thin metallic layer 8 applied to back side 7.2 of sensor diaphragm 7 allows reliable signal transmission, the compressive contacting being produced by spring elements 15. The picked-off signal is transmitted to evaluation electronics 16 accommodated in sensor head 27, via rod-shaped insertion parts 12 made of an electrically conductive material. Due to the selected arrangement of a base body 10, which is insertable into cover tube 9 of sensor neck 3 and made of a nonconductive material, and insertion parts 11, which are integrated into the cover tube, are essentially rod-shaped, and are made of electrically conductive material, insertion parts 11 forming the transmission route for the pressure signals may be insulated and supported so as to be resistant to vibration.

Figure 4:
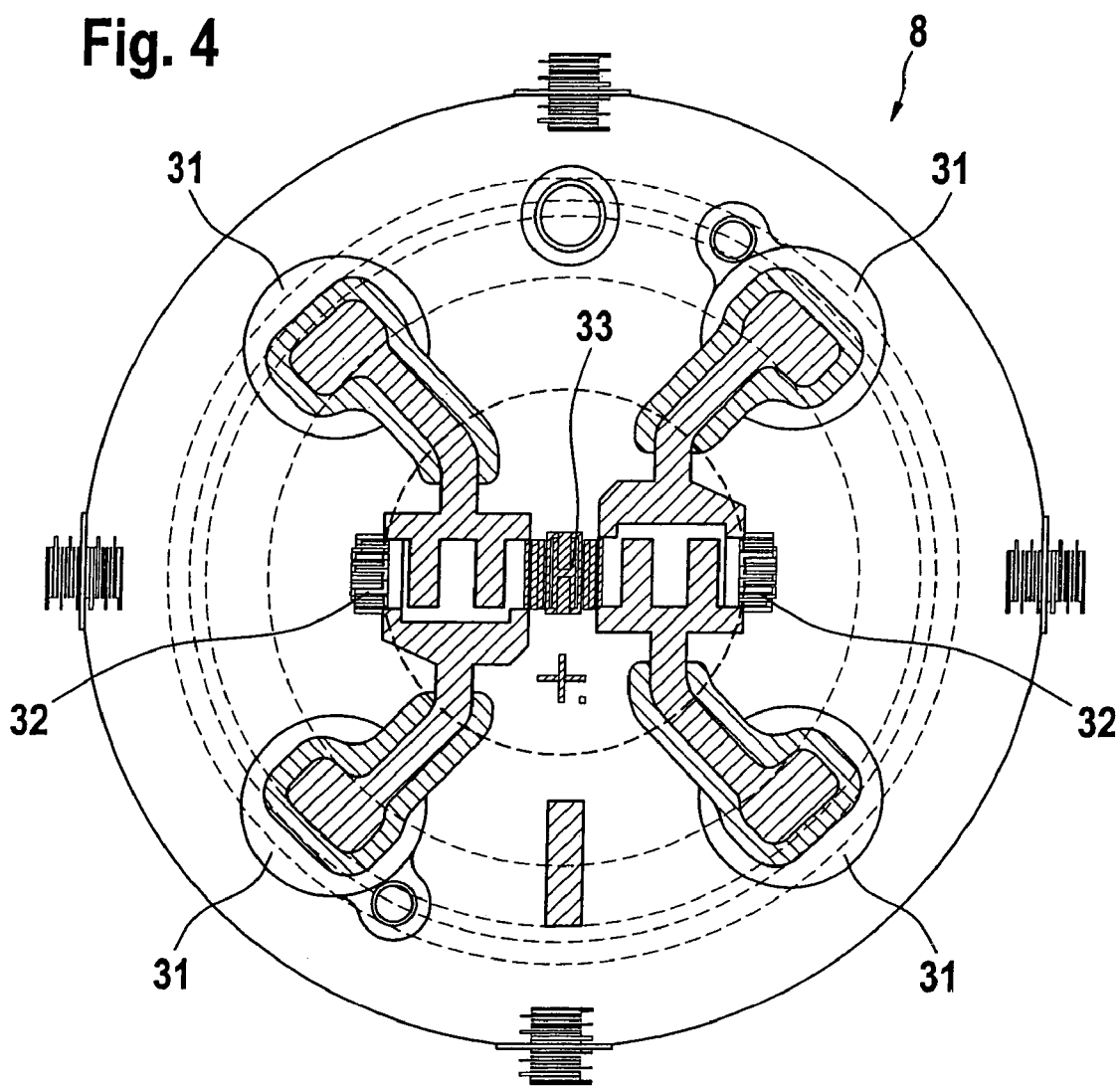
FIG. 4 shows a detailed design layout of the thin metallic layer.

The detailed structure of a thin metallic layer of a thin metallic layer containing piezoresistive measuring elements may be gathered from the representation according to FIG. 4.

Several contact pads 31 are situated on thin, metallic layer 8 containing piezoresistive measuring elements. Contact pads 31 may either be contacted via spring contacts 15, or via Cinch contacts, i.e., wire balls having elastic characteristics, or via a bond or a welded wire connection. Contact pads 31 are electroconductively connected to the specific ends of piezoresistive measuring elements, which are integrated into thin, metallic layer 8. In addition, two thin-film resistors 32, which are compressed when pressure is applied to sensor diaphragm 7, are accommodated in compressed form on the equatorial level of the thin, metallic layer according to the plan view in FIG. 4. In addition, thin, metallic layer 8 shown in FIG. 4 and reproduced in considerably enlarged form has two additional thin-film resistors 33, which are elongated when pressure is applied to sensor diaphragm 7.

Figure 5:
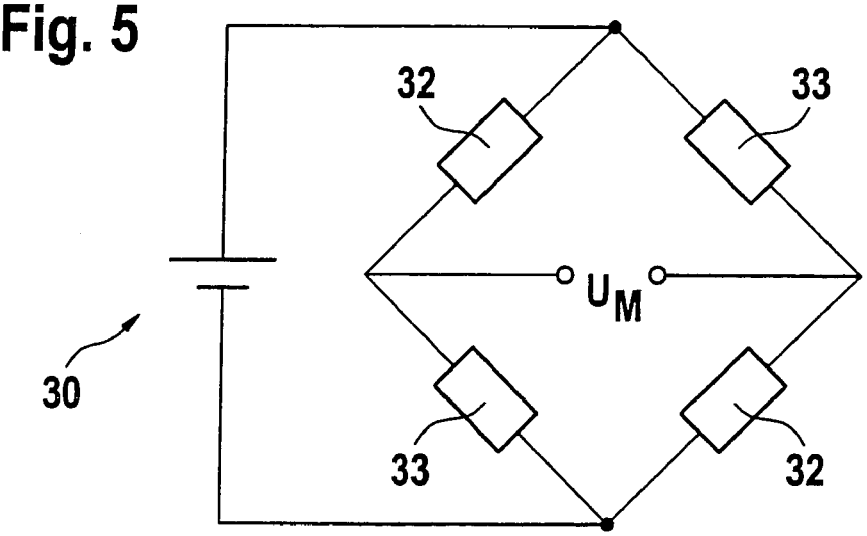
FIG. 5 shows a basic representation of the electrical circuit.

FIG. 5 shows a basic representation of the electrical interconnection configuration of the thin-film resistors.

Thin-film resistors 32 and 33 are interconnected in the form of a bridge circuit. A voltage supply 30 is connected to the bridge circuit. In each instance, measuring voltage $U_M$ is picked off between externally-situated, compressed, thin-film resistor 32 according to FIG. 4 and internally-situated, elongated, thin-film resistors 33 according to FIG. 4. According to FIG. 4, thin-film resistors 33, which are elongated, are positioned in a direction parallel to the equator of thin, metallic layer 8 containing piezoresistive measuring elements.

With the aid of insertion parts 11 made of electrically conductive material, voltage $U_M$ is picked off at contact pads 31 that are drawn into FIG. 4. Depending on the number of contact pads 31 on thin, metallic layer 8 containing piezoresistive measuring elements, up to four insertion parts 11 in the form of rods may be accommodated in base body 10 of pressure sensor 1, the base body being made of nonconductive material.

LIST OF REFERENCE NUMERALS 1 pressure sensor
2 sensor body (PPS ceramic)
3 sensor neck
4 conical sealing seat
5 threaded section
6 end near the combustion chamber
7 sensor diaphragm
7.1 combustion-chamber side
7.2 side facing away from the combustion chamber
8 piezoresistive, thin metallic layer 9 cover tube
10 base element made of nonconductive material
11 insertion parts made of electrically conductive material
12 contacting
13 length of cover tube
14 widened diameter
15 spring contacts
16 evaluation electronics
17 bond contacting
18 plug connector
19 axis of symmetry
20 guide (support) section of the sensor head
21 diameter of the sensor neck
22 diameter of the sensor head
23 hollow space in the sensor head
24 depression
25 insert
26 butt joint
27 sensor head
28 circuit substrate
30 voltage supply
31 contact pad
32 compressed, thin-film resistor
33 elongated, thin-film resistor
$U_M$ measuring voltage

What is claimed is:

1. A pressure sensor for measuring a pressure in a space acted upon by high pressure, signals detected by the pressure sensor being supplied to evaluation electronics, the sensor comprising:
a sensor diaphragm accommodated on an end of the pressure sensor pointing towards the space acted upon by the high pressure, the sensor diaphragm being a steel diaphragm, to whose backside a thin, metallic layer accommodating piezoresistive measuring elements is applied; and
spring elements contacting the thin, metallic layer and connecting the thin, metallic layer to the evaluation electronics.

2. The pressure sensor as recited in claim 1, further comprising:
a sensor head having a diameter that is widened; and
a sensor neck having a diameter that is reduced.

3. The pressure sensor as recited in claim 2, wherein the evaluation electronics are integrated in the sensor head of the pressure sensor.

4. The pressure sensor as recited in claim 1, wherein a body of the sensor has a conical sealing seat formed near a combustion chamber.

5. The pressure sensor as recited in claim 2, wherein the sensor neck includes a cover tube, a threaded section being formed on the cover tube.

6. The pressure sensor as recited in claim 1, further comprising:
a base element made of a nonconductive material, insertion parts made of electrically conductive material being provided for contacting the thin, metallic layer of the sensor diaphragm, and the base element being insertable into the pressure sensor.

7. The pressure sensor as recited in claim 6, wherein, on a first side, the insertion parts form one of a compressive contact, a bond, or a cinch contact, with the thin, metallic layer of the sensor diaphragm, and, on a second side, the insertion parts are connected to the evaluation electronics of the pressure sensor using one of bond contacting or compressive contacting.

8. The pressure sensor as recited in claim 2, wherein the sensor diaphragm is formed in an insert, which is inserted into the sensor neck.

9. The pressure sensor as recited in claim 2, wherein the evaluation electronics are accommodated in a hollow space in the sensor head in a direction one of parallel to an axis of symmetry of the pressure sensor, or perpendicularly to the axis of symmetry, and wherein the evaluation electronics have a printed circuit board fitted with components on at least one side.

10. The pressure sensor as recited in claim 2, wherein the sensor head has a circumferential surface that is used as a support section of the pressure sensor in an installation space.

11. A pressure sensor for measuring a pressure in a combustion chamber of a combustion engine, signals detected by the pressure sensor being supplied to evaluation electronics, the sensor comprising:
a sensor diaphragm accommodated on an end of the pressure sensor pointing towards the space acted upon by the high pressure, the sensor diaphragm being a steel diaphragm, to whose backside a thin, metallic layer accommodating piezoresistive measuring elements is applied; and
spring elements contacting the thin, metallic layer and connecting the thin, metallic layer to the evaluation electronics;
wherein the sensor is accommodated in a cylinder head of the combustion engine.

* * * * *